(12) United States Patent
Hinterberger et al.

(10) Patent No.: US 11,342,763 B2
(45) Date of Patent: May 24, 2022

(54) BATTERY SYSTEM AND METHOD FOR OPERATING A BATTERY SYSTEM

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 17/048,767

(22) PCT Filed: Mar. 18, 2019

(86) PCT No.: PCT/EP2019/056706
§ 371 (c)(1),
(2) Date: Oct. 19, 2020

(87) PCT Pub. No.: WO2019/201528
PCT Pub. Date: Oct. 24, 2019

(65) Prior Publication Data
US 2021/0151998 A1    May 20, 2021

(30) Foreign Application Priority Data
Apr. 20, 2018 (DE) .................. 10 2018 206 096.7

(51) Int. Cl.
*H02J 7/00* (2006.01)
*H01M 10/42* (2006.01)
(Continued)

(52) U.S. Cl.
CPC ......... *H02J 7/0024* (2013.01); *H01M 10/425* (2013.01); *H01M 10/482* (2013.01);
(Continued)

(58) Field of Classification Search
CPC .. H02J 7/0024; H02J 2310/48; H01M 10/425; H01M 10/482; H01M 2010/4278; H01M 2220/20; H01M 50/502
(Continued)

(56) References Cited

U.S. PATENT DOCUMENTS 5,960,898 A     10/1999  Okada et al.
11,120,958 B2 *  9/2021  Dan ...................... B60L 3/0069
(Continued)

FOREIGN PATENT DOCUMENTS

DE    102011054146 A1    4/2012
DE    102011013182 A1    9/2012
(Continued)

OTHER PUBLICATIONS

Notification of Transmittal of Translation of the International Preliminary Report on Patentability dated Oct. 29, 2020, in connection with corresponding international application No. PCT/EP2019/056706 (9 pages).

(Continued)

*Primary Examiner* — Sun J Lin
(74) *Attorney, Agent, or Firm* — Maier & Maier, PLLC

(57) ABSTRACT

A battery system, including multiple battery cells, each of which have respective battery cell housings with electrical terminals via which the multiple battery cells are electrically connected to one another, wherein a cell branch connecting the electrical terminals to a galvanic cell and a bypass branch for bridging the galvanic cell are arranged in each of the respective battery cell housings, each cell branch having a switching element for opening and closing the cell branch and each bypass branch having a bridging switching element for opening and closing the bypass branch.

10 Claims, 10 Drawing Sheets

(51) Int. Cl.
  *H01M 10/48* (2006.01)
  *H01M 50/502* (2021.01)

(52) U.S. Cl.
  CPC .. *H01M 50/502* (2021.01); *H01M 2010/4278* (2013.01); *H01M 2220/20* (2013.01); *H02J 2310/48* (2020.01)

(58) Field of Classification Search
  USPC ........................................................ 320/117
  See application file for complete search history.

(56) References Cited

U.S. PATENT DOCUMENTS

| | | |
|---|---|---|
| 2003/0071523 A1 | 4/2003 | Silverman |
| 2009/0066291 A1 | 3/2009 | Tien et al. |
| 2012/0091964 A1 | 4/2012 | Vance et al. |
| 2014/0015488 A1 | 1/2014 | Despesse |
| 2014/0203650 A1 | 7/2014 | Striuli |

FOREIGN PATENT DOCUMENTS

| | | |
|---|---|---|
| DE | 102011014133 A1 | 9/2012 |
| DE | 102011053728 A1 | 3/2013 |
| DE | 102011056135 A1 | 6/2013 |
| DE | 102014015740 A1 | 4/2016 |
| GB | 2537616 A | 10/2016 |
| WO | 2012/123815 A1 | 9/2012 |
| WO | 2016/005107 A1 | 1/2016 |

OTHER PUBLICATIONS

German Examination Report dated Feb. 14, 2019 in corresponding German Application No. 10 2018 206 396.7; 20 pages; Machine translation attached.

International Search Report (with English translation) and Written Opinion (with Machine translation) dated Jun. 12, 2019 in corresponding International Application No. PCT/EP2019/056706; 18 pages.

* cited by examiner

BATTERY SYSTEM AND METHOD FOR OPERATING A BATTERY SYSTEM

FIELD

The disclosure relates to a battery system and a method for operating such a battery system. Furthermore, the disclosure also relates to a motor vehicle having such a battery system.

BACKGROUND

In battery systems, for example, in the event of faults or depending on the power demand, deactivating or differently interconnecting battery cells interconnected to form modules or also individual battery cells is already known per se. For example, DE 10 2011 053 728 A1 discloses a battery system and a method for switching off energy storage modules connected in series of a battery of a battery system. The battery system consists of multiple cells which are interconnected to form modules which are provided with control and communication devices in order to deactivate the battery cells when a fault is detected.

DE 10 2011 013 182 A1 discloses a safety traction battery for electric vehicles. The safety traction battery consists of cell groups that are equipped with externally switchable isolating elements, by means of which one of the cell groups is separated from the battery in the event of a defect.

DE 10 2011 056 135 A1 discloses an energy generation system having an energy storage system and an associated operating method. Multiple groups of battery cells are connected in series or in parallel via a switching unit as required.

SUMMARY

The object of the present invention is to provide a solution by means of which a battery system having multiple battery cells can be adapted particularly easily to different requirements.

The battery system according to the invention, in particular for a motor vehicle, comprises multiple battery cells that have respective battery cell housings having electrical terminals via which the battery cells are electrically connected to one another, wherein a cell branch connecting the terminals to a galvanic cell is arranged in each of the battery cell housings. The battery system according to the invention is distinguished in that a bypass branch for bridging the respective galvanic cell is arranged in each of the battery cell housings. The cell branch comprises a switching element for opening and closing the cell branch and the bypass branch comprises a bridging switching element for opening and closing the bypass branch. Moreover, the battery system has a cell-external circuit arrangement having multiple switches for interconnecting the battery cells in different circuit configurations. The battery system moreover comprises a control device which is designed to activate all switching elements and bridging switching elements of the battery cells for connecting and bridging the galvanic cells of the battery cells and all switches of the cell-external circuit arrangement to produce the different circuit configurations to meet at least one requirement.

A battery system in the sense of the invention is basically to be understood as an interconnection of multiple galvanic cells or elements. In principle, this can include both primary cells and secondary cells. In the present case, the battery system is also not limited to use in motor vehicles, but can be used to supply energy to any devices. The battery cells can also be so-called solid-state cells and also conventional galvanic cells, such as lithium-ion cells or the like. The battery cells can also be fuel cells, for example. The switching elements, bridging switching elements, and switches can be electronic switching elements, i.e., for example field effect transistors or also diodes. In principle, however, they can also be electromechanical switches, for example relays. It is essential with the switching elements, bridging switching elements, and the switches that they can switch the respective cell branches with the galvanic cells and bypass branches or can separate and connect respective electrical connections between the battery cells outside the cell.

An essential aspect of the battery system according to the invention is that both said bypass branch and the respective switching elements or bridging switching elements of the cell branches and bypass branches are arranged integrated directly in the battery cells, more precisely within the battery cell housing. By means of the battery system according to the invention, it is possible to control individual energy flows at the cell level, which heretofore could not be controlled using conventional methods. In the case of a battery system according to the invention, it is therefore not only possible to intervene at the module level or at the overall battery level, but also at the cell level. In principle, both a centralized control of the connection and bridging of the battery cells and a decentralized control in this regard are possible. It is only through the integration of the switching elements and bridging switching elements in the respective battery cell housing that it is actually possible at all to connect and also disconnect the individual battery cells at the battery cell level in an effective manner. By means of the battery system according to the invention, completely new possibilities thus arise that were previously impossible to implement using conventional battery systems.

Moreover, a further essential aspect of the battery system according to the invention relates to the cell-external circuit arrangement having the multiple switches for interconnecting the battery cells in different circuit configurations. By means of the control device of the battery system, it is possible to activate the cell-external circuit arrangement, i.e. the respective switches of the cell-external circuit arrangement, for different interconnection of the individual battery cells to meet at least one requirement, for example to meet greatly varying performance requirements. In addition, the control device can also activate the switching elements and bridging switching elements which are arranged inside the battery cells.

By means of the battery system according to the invention, it is thus possible, on the one hand, to control cell-internal current flows or energy flows and, on the other hand, to also implement greatly varying current flows or cell configurations outside the cell. In the case of the battery system according to the invention, it is therefore possible in a particularly flexible manner to meet greatly varying requirements, in that greatly varying configurations with regard to the interconnection of the battery cells can be set, on the one hand, at the cell level and, on the other hand, at the cell-external level. Individual galvanic cells at the battery cell level can thus be bridged or connected, for example, wherein it is also possible at the cell-external level to interconnect individual battery cells, modules made up of battery cells, and the like in greatly varying configurations.

An advantageous embodiment of the invention provides that a plurality of the battery cells are interconnected in a parallel circuit to form respective cell blocks, wherein a plurality of the cell blocks are interconnected, preferably in a series circuit, to form respective modules. By connecting the individual battery cells in parallel to form the respective cell blocks, it is possible, among other things, to provide relatively large currents and thus relatively large outputs at the cell block level. If, for example, the cell blocks are then also interconnected in series, a correspondingly high voltage level can be implemented as required.

A further advantageous embodiment of the invention provides that a plurality of the modules are each interconnected in series to form respective module branches, wherein the control device is designed to control the switches in such a way that at least a part of the module branches are interconnected in a series circuit and/or in a parallel circuit. In this way it is possible, for example, to connect the module branches in series or in parallel using a relatively small number of switches in the cell-external circuit arrangement, depending on requirements. If, for example, relatively high currents are required, it is conceivable that the respective module branches are, for example, strictly interconnected in parallel. On the other hand, if currents that are not so high are necessary, for example, while in contrast a relatively high voltage is necessary, for example, it is also possible, for example, to interconnect the module branches strictly in series. Mixed forms are of course also possible, depending on the output and voltage requirements.

According to a further advantageous embodiment of the invention, it is provided that the control device is designed to activate the switches in such a way that at least one of the module branches is separated from the remaining module branches and is thus deactivated. If, for example, a defect occurs in one of the modules of the module branches, it is possible in a simple manner to separate the relevant module branch from the remaining module branches by appropriately activating the appropriate switch for this purpose. In this way, even in the event of a defect in one of the module branches, it is thus also possible to provide energy by means of the battery system without any risk and therefore without problems.

In a further advantageous design of the invention, it is provided that the control device is designed to activate the switches in such a way that a part of the module branches are interconnected to form a first subsystem to provide a first voltage and another part of the module branches are interconnected to form a second subsystem to provide a second voltage. In other words, it is therefore possible to provide a type of selection circuit by means of which a part of the module branches can be dynamically interconnected to form a type of secondary branch of the battery system. Particularly in conjunction with fully autonomous driving of electric vehicles or hybrid vehicles, provision can be made for two 12-volt batteries to be provided in a redundant manner in a vehicle electrical system, for example. By means of the battery system according to the invention it is thus possible to save one of these 12-volt batteries. This is because by means of said selection circuit it is possible to dynamically interconnect part of the module branches to form at least one secondary branch of the battery system, by means of which the otherwise required second 12-volt battery is virtually replaced or branched off. The selection circuit can, for example, have one or also multiple multiplexers, by means of which the individual module branches can be dynamically interconnected in different constellations to form said secondary branch, that is to say to form the second subsystem, which then, for example, discharges into a DC/DC converter, by means of which the corresponding required vehicle electrical system voltage can be provided. If, for example, another battery that is present to supply the vehicle electrical system fails, it is thus possible by means of the battery system according to the invention to replace this failed battery. Installation space and a corresponding weight for said additional battery, for example in the form of a 12-volt battery or also a 48-volt battery, can thus be saved. Nevertheless, a particularly fail-safe energy supply system is made possible overall.

A further advantageous embodiment of the invention provides that the control device is designed to control the switches in such a way that the first subsystem is galvanically isolated from the second subsystem. Galvanic isolation, also known as galvanic decoupling, is understood as the avoidance of electrical conduction between two circuits, between which power or signals are to be exchanged. Galvanic isolation is necessary where there are circuits in a common housing or in a comparable functional unit and at least one is supposed to act on the other, but their reference potentials have to remain separated at the same time. As a result, the battery system can be designed to be particularly safe if necessary. It can also be used for metrological reasons, for example in order to implement potential separation of a voltage supply from measuring devices. Furthermore, it is thus also possible, for example, to prevent so-called hum loops or also electromagnetic interference. In general, this can also result in a decoupling of potential differences. Consistent galvanic isolation is a particularly effective protection against electromagnetic interference.

In a further advantageous design of the invention, it is provided that the cell-external circuit arrangement has so many switches arranged in such a way that all modules can be electrically conductively connected to one another and separated from one another in any combination. This results in a particularly large possibility of variation with regard to the interconnection of the modules. Depending on the requirements for the battery system, it is therefore possible to react to it in a particularly flexible manner by activating the respective switches of the cell-external circuit arrangement in such a way that the modules of the battery system are electrically conductively connected to one another in a present particularly favorable constellation.

In a further advantageous design of the invention it is provided that the control device is designed to activate the cell-internal switching elements and the bridging switching elements in such a way that individual modules are bridged and thus deactivated. It is therefore also possible to use the cell-internal switching elements and bridging switching elements to bridge and deactivate individual modules. If, for example, individual modules are defective, the control device can thus activate the cell-internal switching elements and bridging switching elements in order to bridge these defective modules and thus deactivate them. Even if individual modules are defective, the entire battery system can thus still be used for energy supply without any problems.

According to a further advantageous embodiment of the invention, it is provided that the cell-external circuit arrangement has so many switches arranged in such a way that all battery cells can be electrically conductively connected to one another and separated from one another in any combination. In this case, maximum flexibility results with regard to the interconnection of the individual battery cells. Thus, for example, individual defective battery cells can be separated from the rest of the battery system in a simple manner. It is also possible, depending on the requirement, to interconnect the individual battery cells differently in series and in parallel in order to meet the greatly varying performance requirements and other boundary conditions.

A further advantageous embodiment of the invention provides that the control device has a control unit for each battery cell, which is designed to activate the respective switching elements or contact switching elements of the battery cells to connect or bridge the galvanic cells. These cell-internal control units can be, for example, microcontrollers, which are designed to activate the respective switching elements and bridging switching elements for each battery cell. The intelligence for activating the switching elements and bridging switching elements is thus preferably provided internally in each cell.

In a further advantageous design of the invention, it is provided that the battery cells have respective sensors for detecting at least one operating parameter, which are designed to transmit data relating to the operating parameter to the control device. In this way it is possible to measure greatly varying operating parameters such as voltages, currents, internal cell pressures, and the like for each battery cell, wherein the control device can take these operating parameters into consideration. The individual battery cells can thus be continuously monitored in a reliable manner, wherein individual battery cells can be separated from the rest of the battery system if necessary, for example.

According to a further advantageous embodiment of the invention, it is provided that the battery cells comprise respective communication modules for exchanging data between the battery cells and/or with the control device. For example, it is thus possible that the individual battery cells can exchange data relating to their operating parameters with one another, wherein in the case that the battery cells have respective cell-internal control units, for example in the form of microcontrollers, which can activate individual battery cells, for example, in a decentralized manner themselves with regard to the connection and bridging of the galvanic cells. The communication modules can be designed, for example, to exchange the relevant data wirelessly. A wired exchange of data is of course also possible.

A further advantageous embodiment of the invention provides that the control device is designed to produce the different circuit configurations in dependence on at least one of the following requirements:
- defective battery cells, cell blocks, and/or modules are to be bridged and thus deactivated;
- the battery cells, cell blocks, and/or modules are to be uniformly discharged or charged;
- the battery system is to be adapted to a voltage level of a charging device;
- the battery cells are to age uniformly;
- a power requirement of an electric machine that can be supplied with energy by means of the battery system is to be met.

It is thus possible, for example, without any problems to bridge and deactivate defective battery cells, cell blocks, or entire modules. Furthermore, it is also possible to ensure uniform aging at cell level, cell block level, and/or at module level. It is also possible to discharge or charge the battery system uniformly. If the battery system is used, for example, in an electrically driven motor vehicle, it is thus also possible to adapt a voltage level of the battery system to a voltage level of a charging device. In this way, the battery system can be charged particularly universally and at different charging devices. Furthermore, it is also possible, depending on the power requirement of an electric machine, for example an electric drive of a motor vehicle or the like, to set the respective appropriate circuit configuration in the battery system. For example, if particularly little power is presently required, it is thus possible to temporarily bridge individual elements of the battery system at cell level, cell block level, or also at module level. If, on the other hand, a particularly high power requirement is made, it is thus also possible, for example, to interconnect all of the battery cells of the battery system for the purpose of providing energy or providing power.

The motor vehicle according to the invention comprises the battery system according to the invention or an advantageous embodiment of the battery system according to the invention.

In the method according to the invention for operating the battery system according to the invention or an advantageous embodiment of the battery system according to the invention, the control device of the battery system activates at least a part of the switching elements and bridging switching elements of the battery cells for connecting or bridging the galvanic cells of the battery cells and/or activates at least a part of the switches of the cell-external circuit arrangement to produce a specific circuit configuration in order to meet at least one requirement. Advantageous designs of the battery system according to the invention are to be considered advantageous designs of the method according to the invention and vice versa, wherein the battery system in particular includes means for carrying out the method steps.

Further advantages, features, and details of the invention result from the following description of preferred exemplary embodiments and on the basis of the drawing. The features and feature combinations mentioned above in the description as well as the features and feature combinations mentioned below in the description of the figures and/or merely shown in the figures may be used not only in the combination specified, but also in other combinations or alone, without departing from the scope of the invention.

In the figures:

DETAILED DESCRIPTION

Identical or functionally identical elements have been provided with the same reference signs in the figures.

Figure 1:
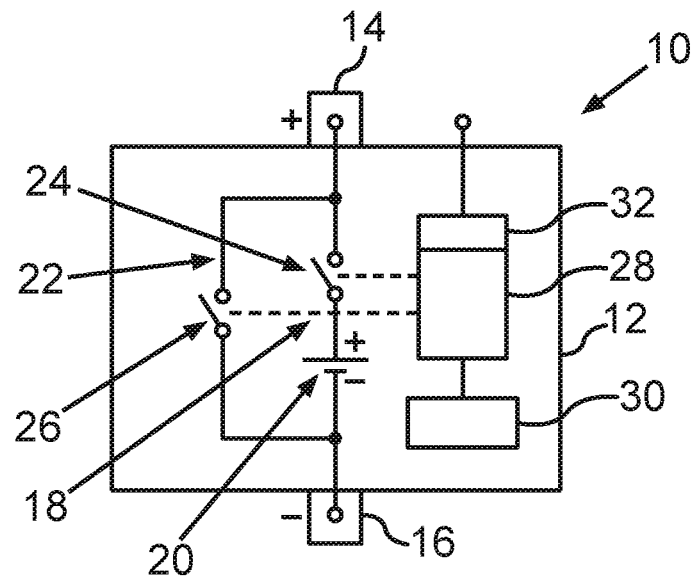
FIG. 1 shows a schematic illustration of a battery cell, which includes a cell branch having a galvanic cell and a bypass branch for bridging the galvanic cell as well as a microcontroller, a communication module, and a sensor.

A battery cell 10 is shown in a schematic illustration in FIG. 1. The battery cell 10 comprises a battery cell housing 12 having electrical terminals 14, 16, via which this battery cell 10 can be interconnected in an electrically conductive manner with other battery cells 10 (not shown here). A cell branch 18 which connects the terminals 14, 16 to a galvanic cell 20 is arranged on the battery cell housing 12. The galvanic cell 20 can be a lithium-ion cell, for example. In principle, the battery cell 10 can have greatly varying types of galvanic cells in the cell branch 18.

A bypass branch 22 for bridging the galvanic cell 20 is also arranged in the battery cell housing 12. The cell branch 18 comprises a switching element 24 for opening and closing the cell branch 18. The bypass branch 22 comprises a bridging switching element 26 for opening and closing the bypass branch 22.

Moreover, a control unit 28 designed as a microcontroller is arranged in the battery cell housing 12, which is designed to activate the switching element 24 and the bridging switching element 26 to open or close. Furthermore, the battery cell 10 comprises one or more sensors 30 in its battery cell housing 12, which are designed to acquire greatly varying operating parameters of the battery cell 10. Thus, for example, voltages, currents, internal cell pressures, and the like can be acquired within the cell and relayed to the microcontroller 28. In dependence on the operating parameters acquired in each case, the microcontroller can bridge or connect the galvanic cell 20 by actuating the switching element 24 or the bridging switching element 26, respectively. Moreover, the battery cell 10 comprises a communication module 32. The communication module 32 can transmit greatly varying data, such as a respective switching state of the switching element 24 or the bridging switching element 26 and also operating parameters acquired by means of the sensor 30 to other communication modules 32 of further battery cells 10. It is also possible that the communication module 32 transmits said data to a higher-level control device of the system, in which a plurality of the battery cells 10 are installed.

Figure 2:
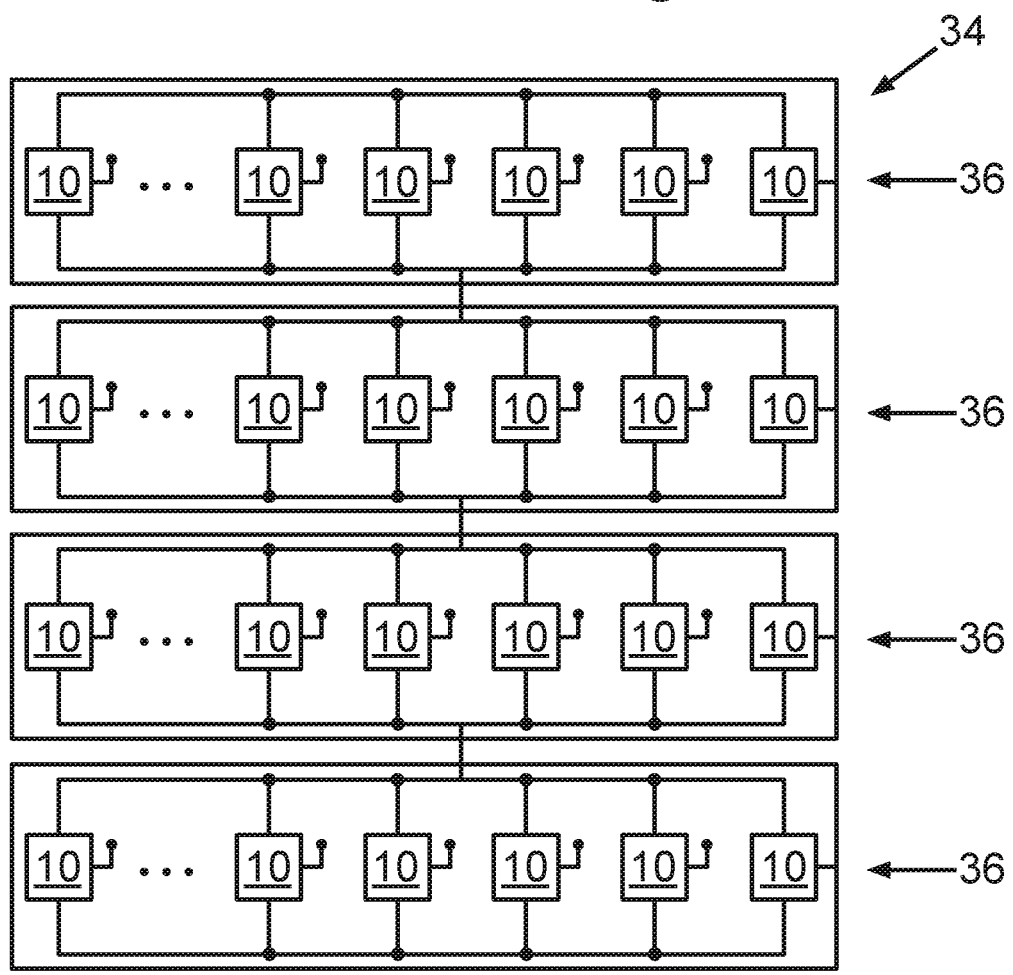
FIG. 2 shows a schematic illustration of multiple battery cells, which are each interconnected in a parallel circuit to form cell blocks, wherein a plurality of the cell blocks are interconnected in a series circuit to form a module.

A module 34 is shown schematically in FIG. 2, wherein the module 34 has a plurality of the battery cells 10. The battery cells 10 are each interconnected in a parallel circuit to form respective cell blocks 36. According to the present illustration, the cell blocks 36 are also interconnected in a series circuit to form the module 34.

Figure 3:
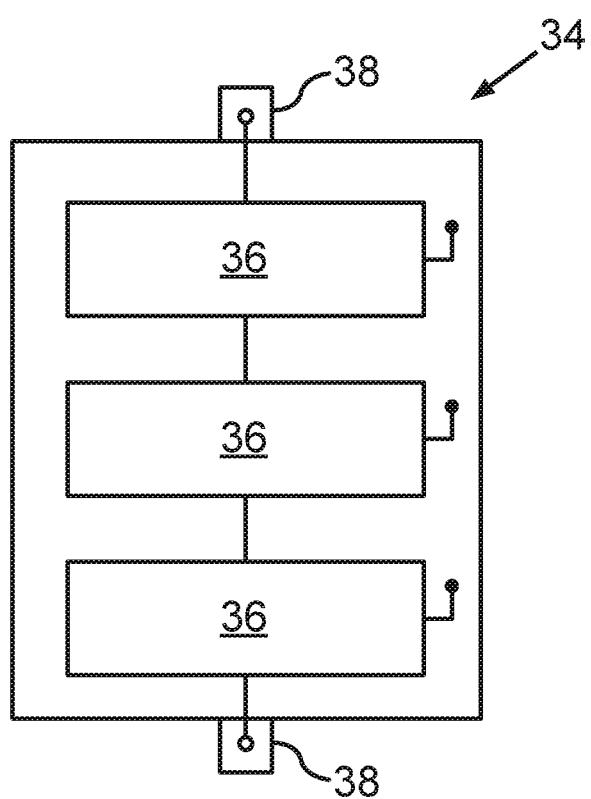
FIG. 3 shows a further schematic illustration of a module, which includes a plurality of the cell blocks interconnected in series.

In FIG. 3, the module 34 is shown in a further schematic view. The module 34 has two terminals 38, via which the module 34 can be interconnected with further modules 34 (not shown here).

Figure 4:
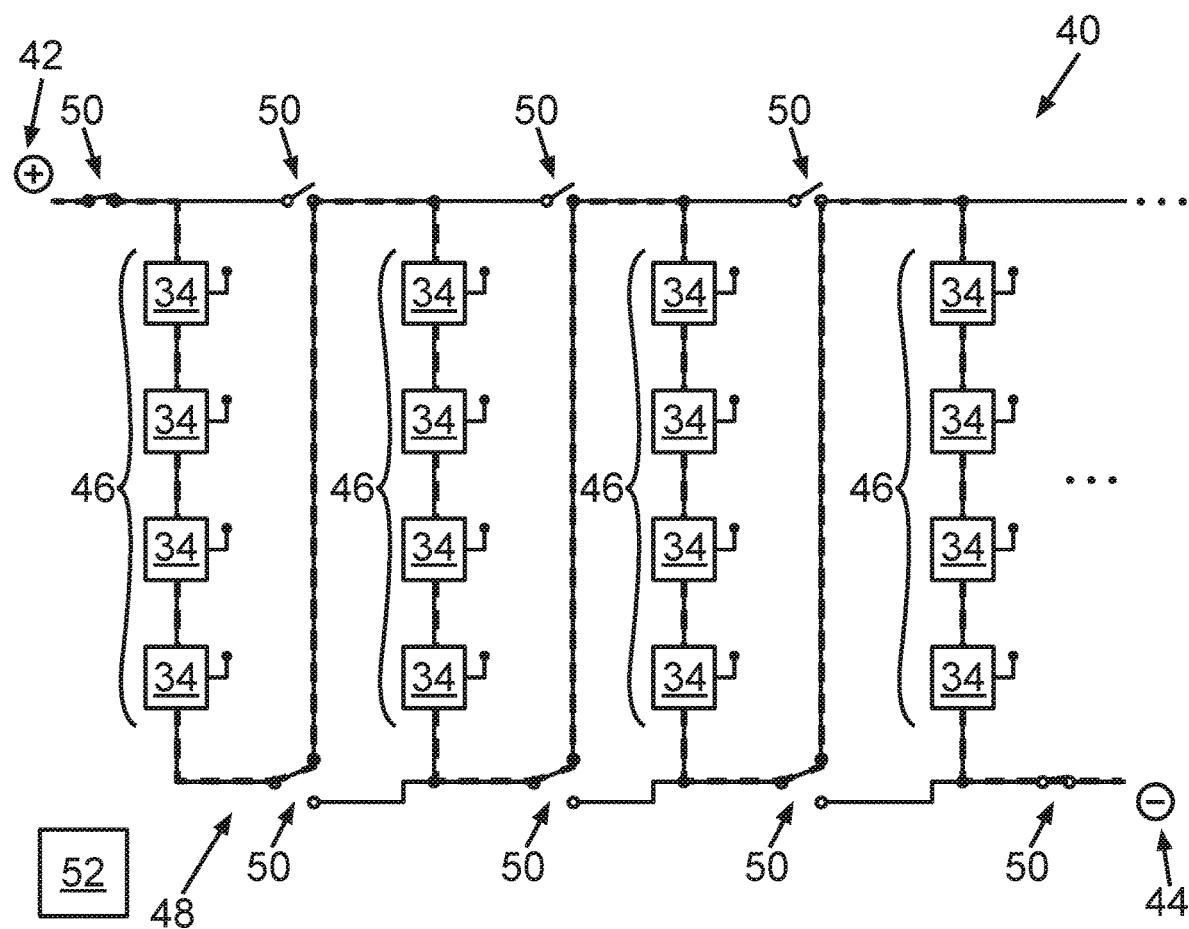
FIG. 4 shows a schematic illustration of a battery system, wherein a plurality of the modules are each interconnected in series to form respective module branches, which have been interconnected in series via a cell-external circuit arrangement having multiple switches.

A battery system 40 is shown schematically in FIG. 4, wherein the battery system 40 includes a plurality of the modules 34. A positive pole 42 and a negative pole 44 of the entire battery system 40 are also only indicated schematically. A plurality of the modules 45 are each interconnected in series to form respective module branches 46. The battery system 40 also comprises a cell-external circuit arrangement 48 having multiple switches 50 for different interconnecting of the modules 34. In addition, the battery system 40 comprises a control device 52 (only indicated schematically here), which is designed to activate the switches 50 of the cell-external circuit arrangement 48 to produce different circuit configurations in order to meet at least one requirement. The control device 52 can therefore open or close the switches 50 as required in order to interconnect the modules 34 or the module branches 46 in different ways. The control device 52 can also include the cell-internal control units 28, which are designed as microcontrollers and mentioned in conjunction with FIG. 1. In this case, the control device 52 is thus also designed to activate all switching elements 24 and bridging switching elements 26 of the individual battery cells 10 to connect and bridge the respective galvanic cells 20 in order to meet greatly varying requirements.

According to the present illustration in FIG. 4, the individual switches 50 were actuated by means of the control device 52 in such a way that the individual module branches 46 have been interconnected in series.

Figure 5:
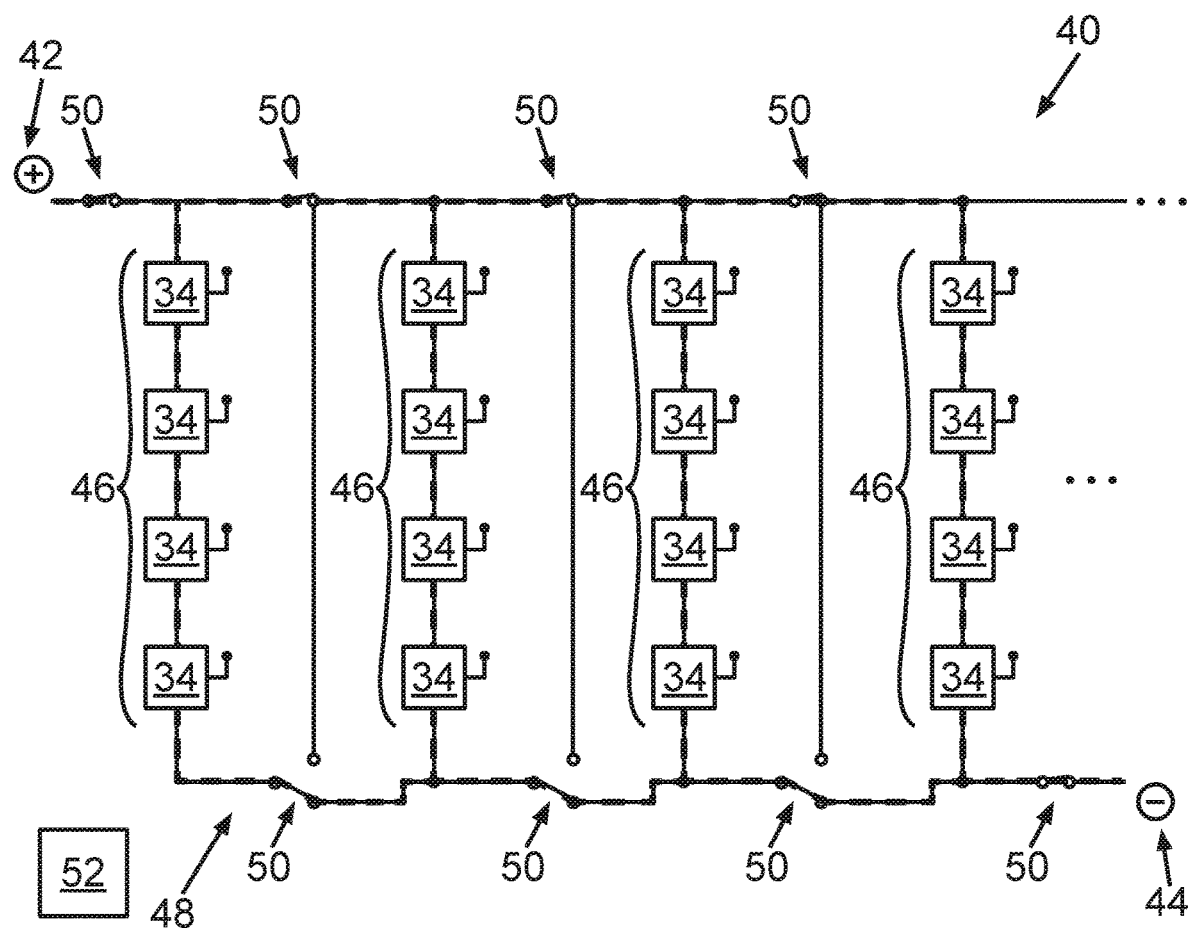
FIG. 5 shows a further schematic illustration of the battery system, wherein a plurality of the module branches are interconnected in series.

In FIG. 5, the battery system 40 is shown in a further schematic view, wherein the individual switches 50 of the cell-external circuit arrangement 48 have been closed or opened differently than in FIG. 4. According to the present illustration, the switches 50 have been actuated in such a way that the individual module branches 46 have been interconnected in a parallel circuit. In other words, according to the present illustration, the battery system 40 is thus operated in a parallel mode. The prerequisite for this is that the respective voltages of the individual module branches 46 are the same.

Figure 6:
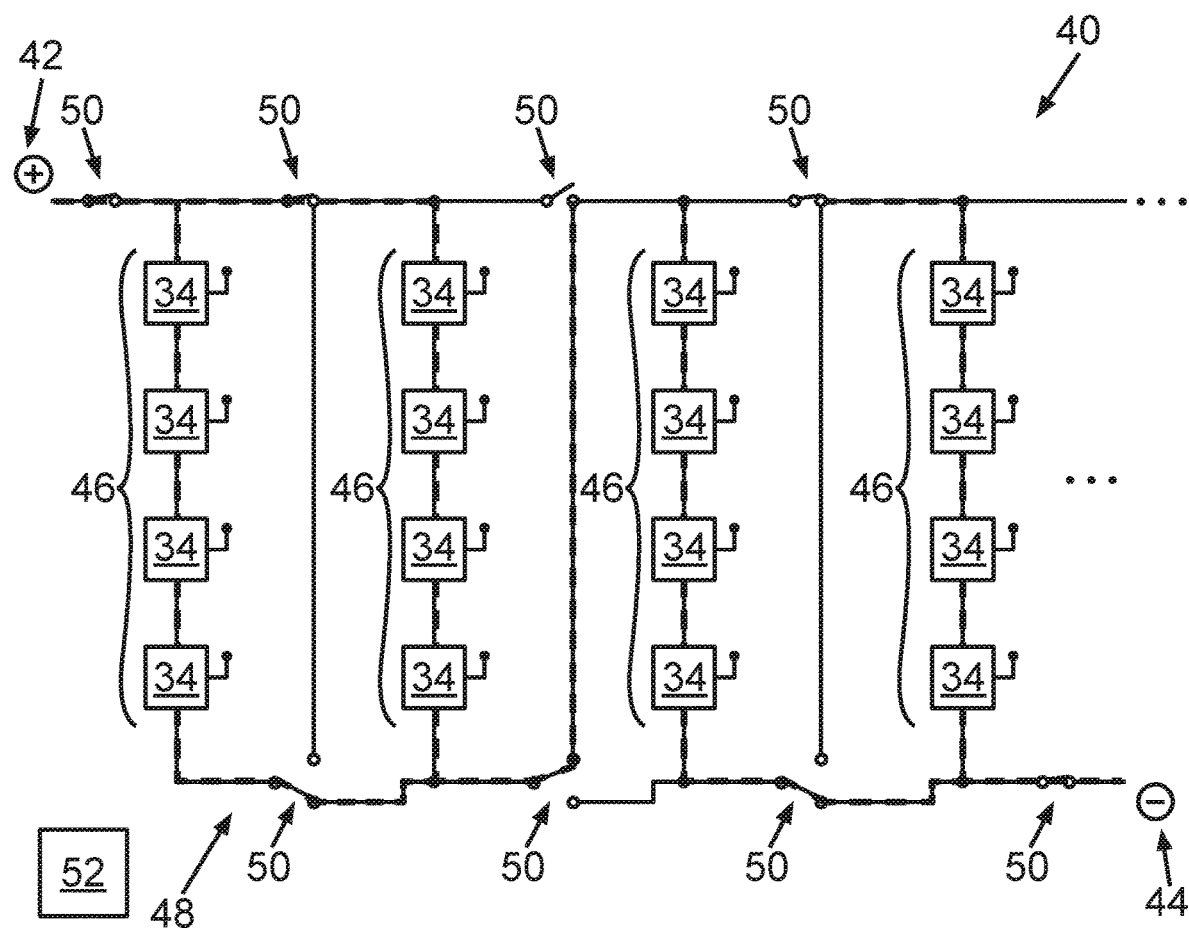
FIG. 6 shows a further schematic illustration of the battery system, wherein each two of the module branches are interconnected in parallel and the module branches interconnected in parallel are in turn interconnected in series.

In FIG. 6, the battery system 40 is shown in a further schematic illustration, wherein the individual switches 50 of the cell-external circuit arrangement 48 have been actuated so that the left two module branches 46 and the right two module branches 46 have each been interconnected in parallel, wherein the module branches 46 interconnected in parallel have in turn been connected in series to one another.

Figure 7:
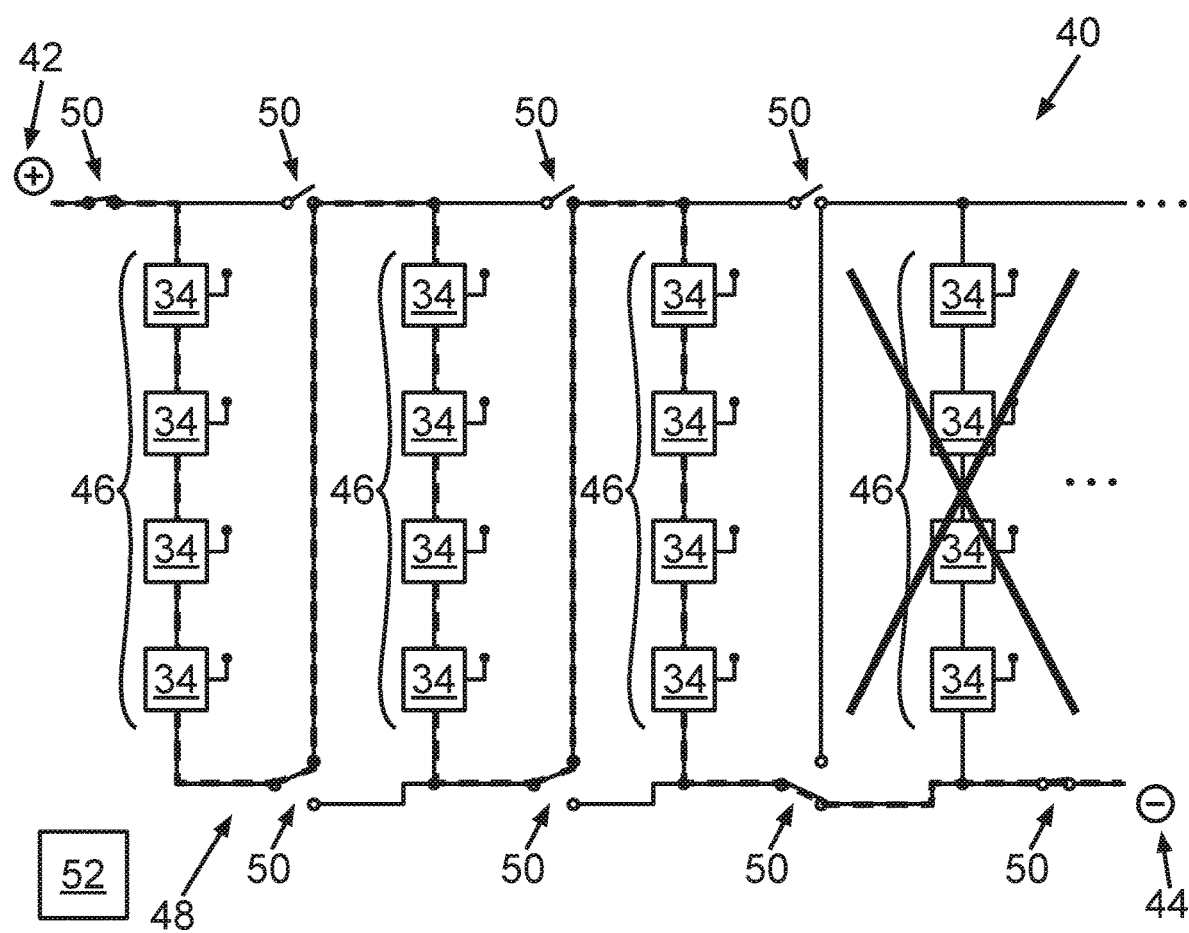
FIG. 7 shows a further schematic illustration of the battery system, wherein one of the module branches has been separated from the remaining module branches and has thus been deactivated.

In FIG. 7, the battery system 40 is shown in a further schematic illustration. In the case shown here, the switches 50 of the cell-external circuit arrangement 48 have been actuated in such a way that the three left module branches 46 have been connected in series, wherein the right module branch 46 has been separated from the rest of the battery system 40 and thus deactivated. Only a subsystem of the battery system 40 is thus used for energy supply here. For example, it is conceivable that the right module branch 46 or individual modules 34 of the right module branch 46 are defective. In this case, it is possible, for example, to separate the entire right module branch 46 from the rest of the battery system 40. If the battery system 40 is used, for example, to supply energy to an electric drive of a motor vehicle, it is thus also possible to use a part of the battery system 40 to provide energy or power even if there are defects in individual modules 34 or if there are defects in entire module branches 46.

Figure 8:
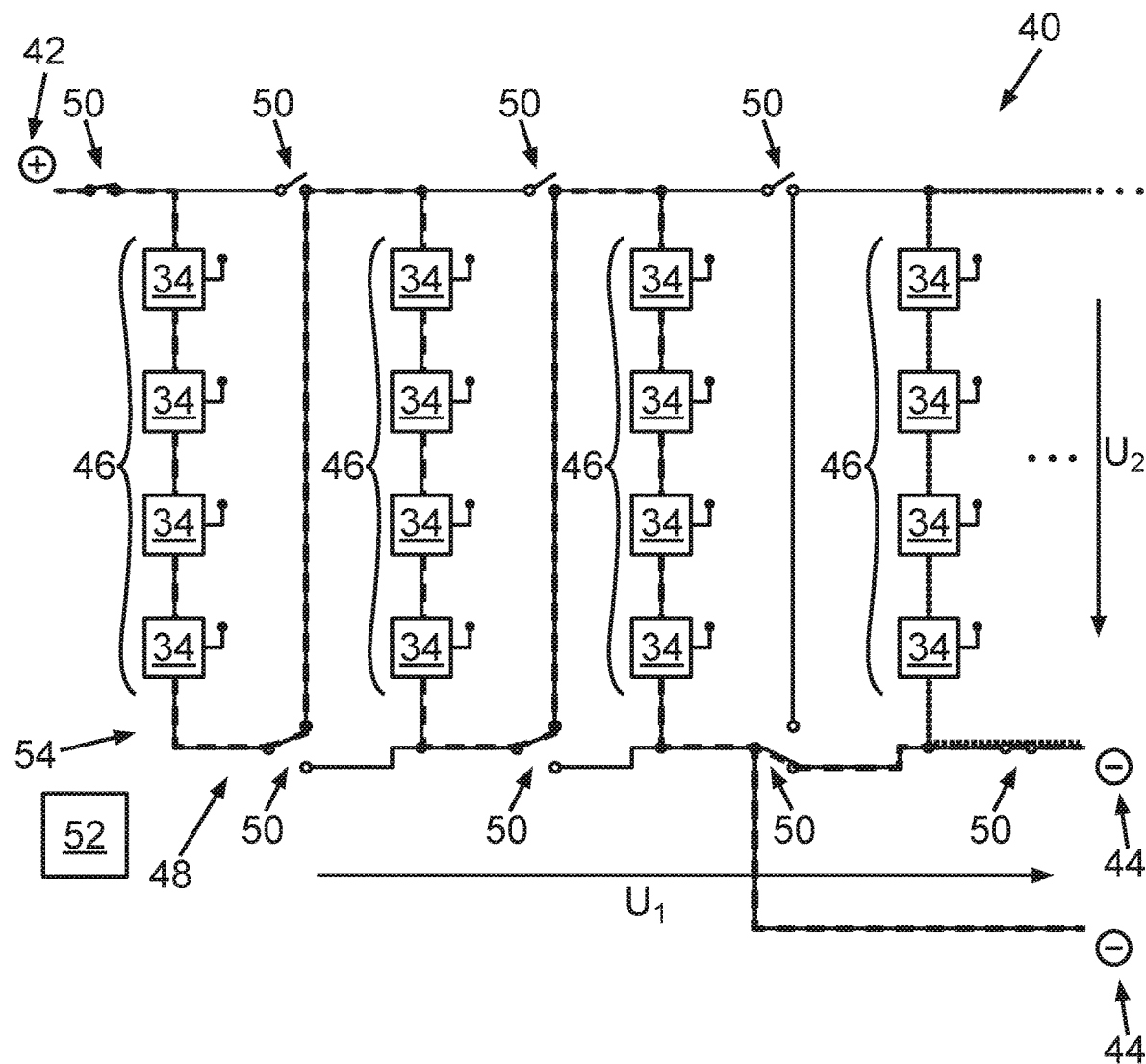
FIG. 8 shows a further schematic illustration of the battery system, wherein a part of the module branches has been interconnected to form a first subsystem to provide a first voltage and another part of the module branches has been interconnected to form a second subsystem to provide a second voltage.

The battery system 40 is shown in FIG. 8 in a further schematic illustration. In the case shown here, the control device 52 has actuated or activated the switches 50 in such a way that a part of the module branches 46 has been interconnected to form a first subsystem 54 for providing a first voltage $U_1$ and another part of the module branches 46, according to the present illustration, the right of the module branches 46, has been interconnected to form a second subsystem 56 for providing a second voltage $U_2$. The control device 52 can also activate the switches 50 in such a way that the first subsystem 54 is galvanically separated from the second subsystem 56. For example, it is conceivable that the battery system 40 is used in an electric vehicle. In conventional operation, the battery system 40 is simply used to supply an electric drive with energy. Another battery (not shown here), for example a 12-volt battery or also a 48-volt battery, is used to supply the rest of the vehicle electrical system with energy. If this additional battery fails, the battery system 40 can be configured by appropriate activation of the switches 50 so that—according to the present illustration—the right module branch 46 is used to supply the vehicle electrical system with energy. The second subsystem 56 is thus used to supply the vehicle electrical system with energy, while in contrast the first subsystem 54 of the battery system 40 can continue to be used to drive the vehicle. A type of selection circuit is thus implemented via the switches 50, by means of which it is possible to divide the battery system 40 into different subsystems 54, 56, which can provide different voltages $U_1$, $U_2$.

Figure 9:
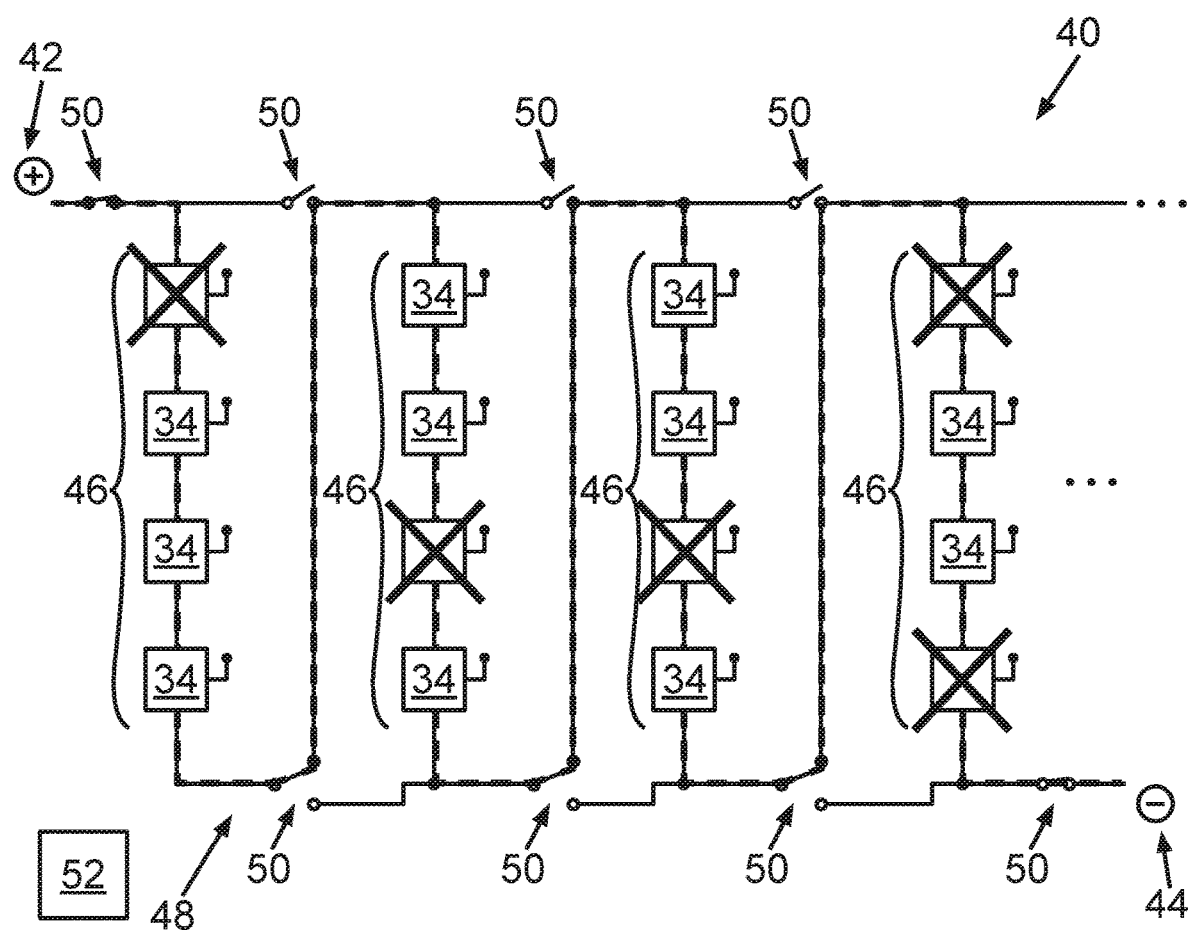
FIG. 9 shows a further schematic illustration of the battery system, wherein individual modules have been deactivated and bridged.

In FIG. 9, the battery system 40 is shown in a further schematic illustration. In the case shown here, some of the modules 34 are completely or partially defective. For example, some of the battery cells 10 or also individual ones of the battery cells 10 in the modules 34 can be defective. In order to be able to continue to use the battery system 40 to provide energy, the defective modules 34 were bridged and thus deactivated. For example, the control device 52 can cause the individual control units 28 designed as microcontrollers (see FIG. 1) to close the respective bypass branches 22 in the defective modules 34 and to open the cell branches, so that the respective galvanic cells 20 are bridged. In other words, the respective switching elements 24 of the cell branches 18 in the defective modules 34 are thus opened and the respective bridging switching elements 26 of the bypass branches 22 are closed. As a result, individual defective battery cells 10 can be bridged in a simple manner and entire modules 34 can be bridged in this way. The remaining modules 34 have in turn been interconnected in series according to the present illustration. Defective or also critical operating states of the individual battery cells 10 can be detected, for example, by the sensors 30 installed in the cells. Data or information relevant thereto can be exchanged between the individual battery cells 10. Moreover, it is also possible that the battery cells 10 transmit data relevant thereto to the higher-level control device 52, which then decides based thereon which of the modules 34 are to be bridged and thus deactivated.

Figure 10:
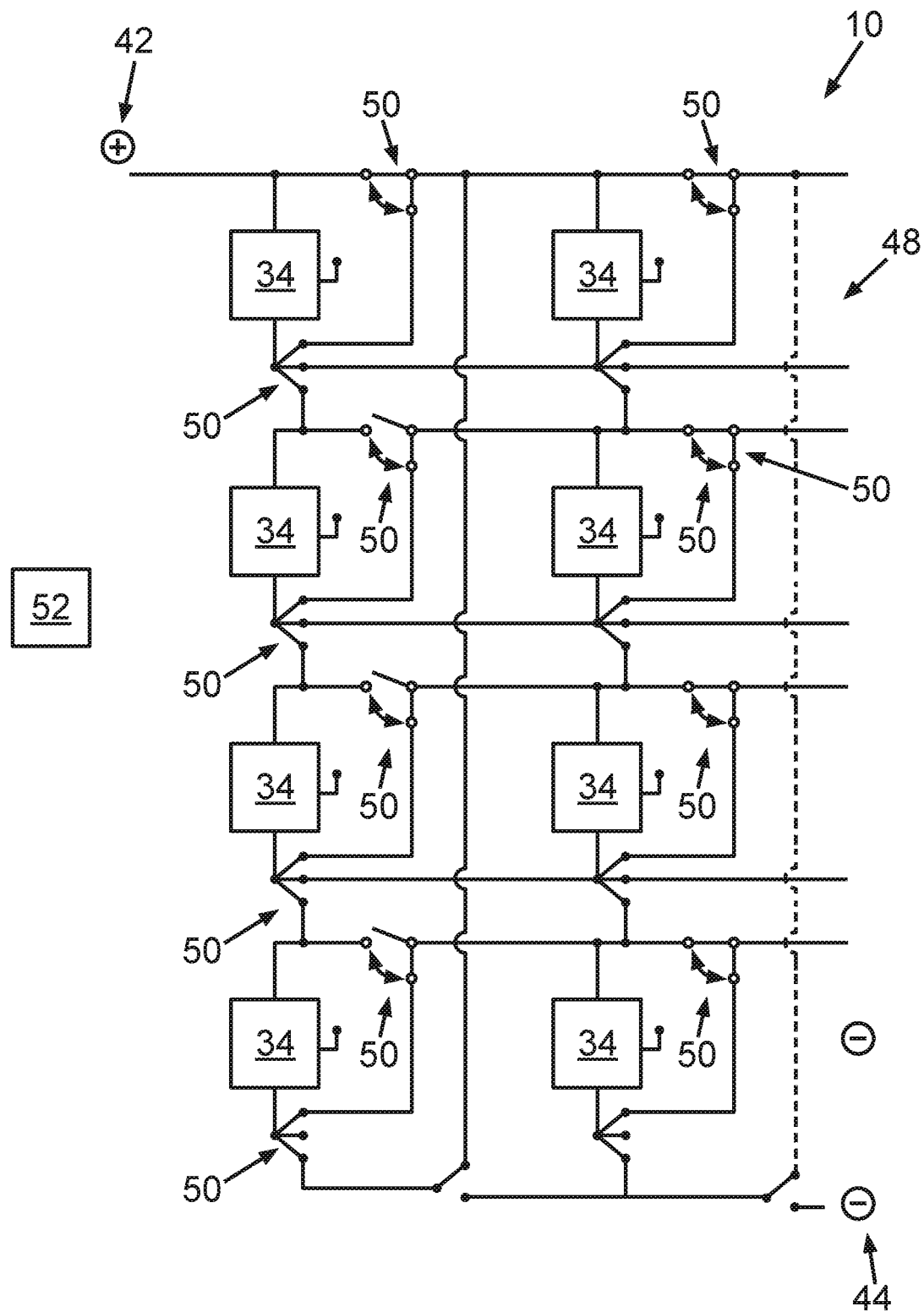
FIG. 10 shows a further schematic illustration of the battery system, wherein the cell-external circuit arrangement of the battery system has so many switches arranged in such a way that all modules can be electrically conductively connected to one another and separated from one another in any combination.

A further possible embodiment of the battery system 40 is schematically shown in FIG. 10. In the case shown here, the cell-external circuit arrangement 48 has so many switches 50 arranged in such a way that all modules 34 can be electrically conductively connected to and separated from one another in any combination. The control device 52 can therefore open and close all switches 50 of the cell-external circuit arrangement 48 as required. In addition, the control device 52 can in turn also open and close the individual cell branches 18 or bypass branches 22 of the individual battery cells 10 by corresponding actuation or activation of the switching elements 24 or bridging switching elements 26. In the embodiment of the battery system 40 shown here, there are even greater possibilities for variation with respect to the configuration of the interconnection of the individual modules 34, since so many switches 50 are arranged and provided in such a way that the individual modules 34 can be interconnected in any combination in series and in parallel.

Figure 11:
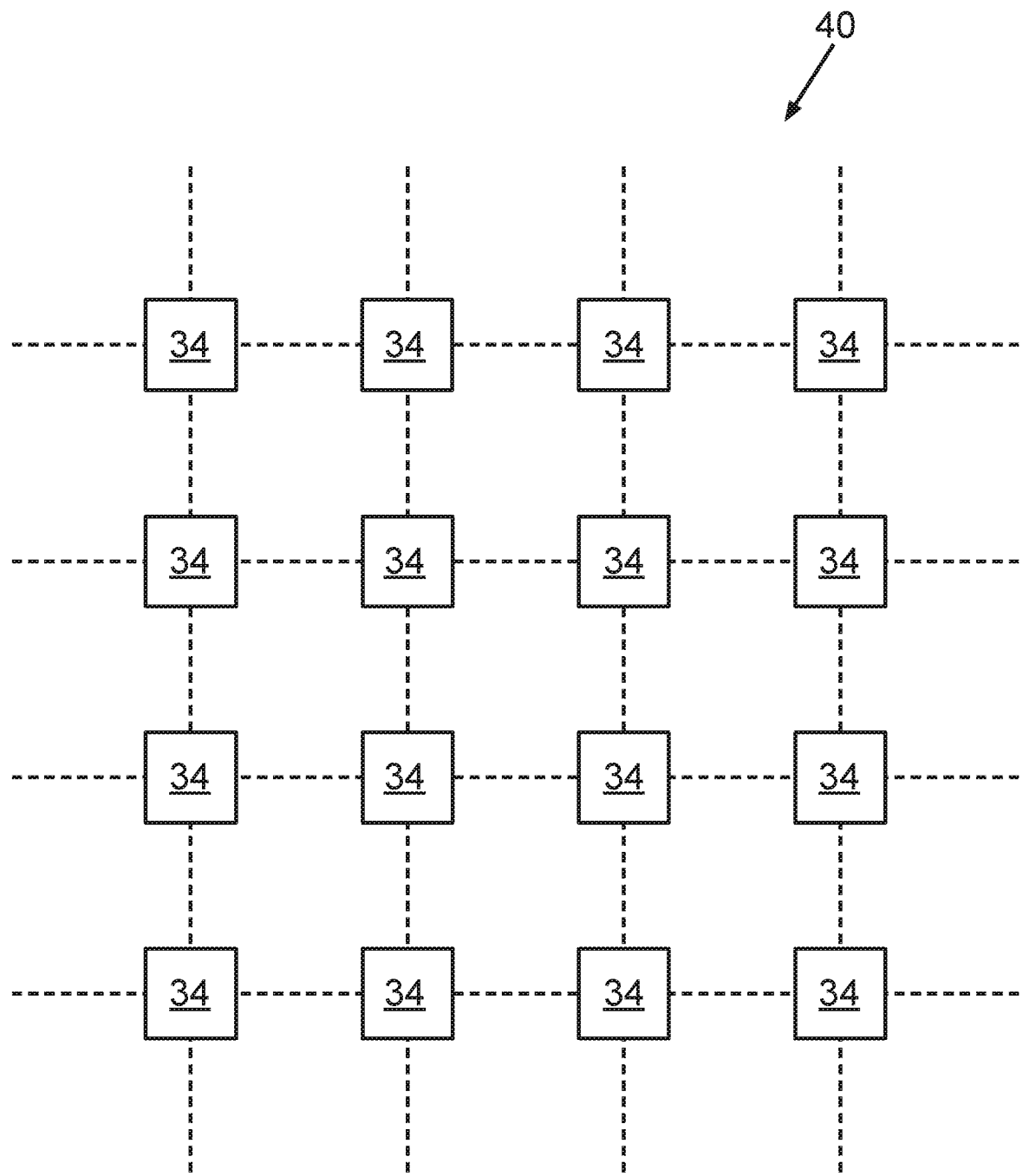
FIG. 11 shows a further schematic illustration of the battery system, wherein the individual modules of the battery system are shown arranged in a matrix.

A further possible embodiment of the battery system 40 is schematically indicated in FIG. 11. In the case shown here, the cell-external circuit arrangement 48 (not designated in greater detail) can have so many switches 50 arranged in such a way that all of the battery cells 10 of the battery system 40 can be connected to and separated from one another in an electrically conductive manner in any combination. This results in the maximum possible variability with respect to the interconnection of the individual battery cells 10.

In all embodiments of the battery system 40, the control device 52 is able to produce different circuit configurations at the cell level, at the cell block level, or also at the module level in dependence on greatly varying requirements. For example, defective battery cells 10, individual defective cell blocks 36, or also individual defective modules 34 can be bridged and thus deactivated. The battery cells 10, the cell blocks 36, and the modules 34 can also be uniformly discharged or charged by the cell-internal switching elements 24 or bridging switching elements 26, and/or the switches 50 of the cell-external circuit arrangement 48 being actuated accordingly. Moreover, it is also possible to adapt the battery system 40 to a voltage level of a charging device. If the battery system 40 is used, for example, in an electric vehicle, it can thus be ensured by appropriate interconnection at cell level, cell block level, or also module level that the respective voltage level of battery system 40 matches a very specific charging device that the motor vehicle is currently approaching. Moreover, it is also possible to perform the interconnection at cell level, cell block level, and/or module level in such a way that the individual battery cells 10 age uniformly. Furthermore, it is also possible to react dynamically to a respective performance requirement of an electric machine which is to be supplied with energy by means of the battery system 40. If the battery system 40 is used, for example, to drive an electric vehicle, it is thus possible, for example, to interconnect the battery cells 10, the cell blocks 36, or the modules 34 as required, depending on the position of the accelerator pedal. Overall, the explained battery system 40 makes it possible to adapt the battery system 40 to greatly varying boundary conditions, on the one hand, to meet external performance requirements and, on the other hand, to enable particularly reliable and long-lasting operation of the battery system 40.

The invention claimed is:

1. A battery system, comprising:
    a control device, and
    a plurality of module branches,
    wherein each of the plurality of module branches comprises:
        two module switches for operatively interconnecting the plurality of module branches in series and/or parallel; and
        at least one battery module connected in series,
    wherein each of the at least one battery module comprises a plurality of cell blocks connected in series,
    wherein each of the plurality of cell blocks comprises a plurality of battery cells connected in parallel, wherein each of the plurality of battery cells comprises:
a cell housing;
a cell branch arranged within the cell housing, the cell branch comprising a galvanic cell and a switching element for closing and opening the cell branch, thereby operatively connecting or disconnecting the galvanic cell with terminals of the respective battery cell; and
a bypass branch also arranged within the cell housing, the bypass branch comprising a bridging switching element for closing and opening the bypass branch to selectively bypass the cell branch,
wherein the control device is configured to selectively activate the module switches, the switching elements, and the bridging switching elements to produce a plurality of circuit configurations to meet at least one requirement of the battery system,
wherein the control device is designed to activate the module switches, the switching elements, and the bridging switching elements so that a first part of the plurality of module branches is interconnected to form a first subsystem and a second part of the plurality of module branches is interconnected to form a second subsystem which is galvanically isolated from the first subsystem, and
wherein the battery system thereby simultaneously provides a first operating voltage generated by the first subsystem and a second operating voltage generated by the second subsystem, which are each usable by devices connected to the battery system.

2. The battery system as claimed in claim 1, wherein the control device is designed to activate the module switches, the switching elements, and the bridging switching elements so that at least one of the plurality of module branches is separated from a remainder of the plurality of module branches and is thus deactivated.

3. The battery system as claimed in any one of claim 1, wherein each of the plurality of module branches comprises only one battery module, and
wherein the two module switches of each of the plurality of module branches are configured to interconnect and/or disconnect the plurality of module branches in any combination.

4. The battery system as claimed in claim 1, wherein the control device is configured to deactivate one or more of the cell modules by opening the switching elements and closing the bridging switching elements of the battery cells contained therein.

5. The battery system according to claim 1, wherein the two module switches of one or more of the plurality of module branches are configured as multiplexers.

6. The battery system according to claim 1, wherein each battery cell further comprises a control unit arranged within the cell housing, which is configured to activate the switching element and the bridging switching element.

7. The battery system according to claim 1, wherein each battery cell further comprises at least one sensor arranged in the cell housing to acquire at least one operating parameter, which is then transmitted to the control device.

8. The battery system according to claim 1, wherein each battery cell further comprises a communication module for exchanging data between other battery cells and/or the control device.

9. The battery system according to claim 1, wherein the control device is configured to select between the plurality of circuit configurations based on at least one of the following requirements:
one or more defective battery cells, cell blocks, and/or modules must be deactivated;
the battery cells, cell blocks, and/or modules are to be uniformly discharged or charged;
the battery system is to be adapted to a voltage level of a charging device;
the plurality of battery cells are to age uniformly; and
a performance requirement of an electric machine, which can be supplied with energy by means of the battery system, is to be met.

10. A method for operating a battery system according to claim 1, wherein the control device of the battery system activates at least a part of the module switches, the switching elements, and the bridging switching elements to produce a specific one of the plurality of circuit configurations to meet the at least one requirement.

* * * * *